(12) United States Patent
Pirner (10) Patent No.: US 11,479,334 B2
(45) Date of Patent: Oct. 25, 2022

(54) MODULAR FLOOR INSTALLATION SYSTEM AND METHOD

(71) Applicant: CAP Carpet, Inc., Wichita, KS (US)

(72) Inventor: Aaron Pirner, Wichita, KS (US)

(73) Assignee: CAP Carpet, Inc., Wichita, KS (US)

( * ) Notice: Subject to any disclaimer, the term of this patent is extended or adjusted under 35 U.S.C. 154(b) by 721 days.

(21) Appl. No.: 16/415,149

(22) Filed: May 17, 2019

(65) Prior Publication Data

US 2020/0001967 A1 Jan. 2, 2020

Related U.S. Application Data (60) Provisional application No. 62/691,788, filed on Jun. 29, 2018.

(51) Int. Cl.
| | |
|---|---|
| *B64C 1/18* | (2006.01) |
| *B32B 3/14* | (2006.01) |
| *B32B 7/12* | (2006.01) |
| *B32B 7/06* | (2019.01) |
| *B32B 5/18* | (2006.01) |
| *B32B 27/40* | (2006.01) |
| *E04F 15/18* | (2006.01) |
| *E04F 15/02* | (2006.01) |
| *B64C 1/00* | (2006.01) |

(52) U.S. Cl.
CPC .............. *B64C 1/18* (2013.01); *B32B 3/14* (2013.01); *B32B 5/18* (2013.01); *B32B 7/06* (2013.01); *B32B 7/12* (2013.01); *B32B 27/40* (2013.01); *B32B 2266/0278* (2013.01); *B32B 2266/08* (2013.01); *B32B 2307/208* (2013.01); *B32B 2307/732* (2013.01); *B32B 2307/744* (2013.01); *B32B 2451/00* (2013.01); *B32B 2605/18* (2013.01); *B64C 2001/0072* (2013.01); *E04F 15/02144* (2013.01); *E04F 15/18* (2013.01)

(58) Field of Classification Search
None
See application file for complete search history.

(56) References Cited

U.S. PATENT DOCUMENTS

| | | |
|---|---|---|
| 5,827,022 A | 10/1998 | Tovani |
| 2010/0115870 A1 | 5/2010 | Stanchfield et al. |

(Continued)

FOREIGN PATENT DOCUMENTS

| | | | |
|---|---|---|---|
| SU | 383652 A1 | 5/1973 | |
| WO | 2016062673 A1 | 4/2016 | |
| WO | WO-2016062673 A1 * | 4/2016 | ............. B32B 27/06 |

OTHER PUBLICATIONS

Schoch, Stefan, Flooring System, Apr. 28, 2016, machine translation of WO2016062673 (Year: 2016).*

(Continued)

*Primary Examiner* — Chinessa T. Golden
(74) *Attorney, Agent, or Firm* — Erise IP, P.A.

(57) ABSTRACT

A system and method of a modular floor assembly and installation on an aircraft is presented in embodiments herein. A floor assembly comprising an underlayment layer and a decorative layer may be assembled to provide an aircraft floor that meets Federal Aviation Regulations. The floor assembly may comprise structural, adhesive, and magnetic layers creating a floor assembly that may be quickly and easily removable for maintenance and access to compartments below the floor assembly.

20 Claims, 4 Drawing Sheets

(56) References Cited

U.S. PATENT DOCUMENTS

2017/0058536 A1  3/2017  Walens et al.
2017/0254094 A1  9/2017  Krausz

OTHER PUBLICATIONS

PCT Patent Application PCT/US2019/038930, International Search Report and Written Opinion; dated Sep. 19, 2019.
European Application No. 19827218.9, Extended European Search Report, dated Feb. 17, 2022.

* cited by examiner

MODULAR FLOOR INSTALLATION SYSTEM AND METHOD

RELATED APPLICATIONS

This non-provisional patent application claims priority benefit, with regard to all common subject matter, of earlier-filed U.S. Provisional Patent Application No. 62/691,788, filed Jun. 29, 2018, and entitled "MODULAR FLOOR INSTALLATION SYSTEM AND METHOD." The identified earlier-filed provisional patent application is hereby incorporated by reference in its entirety into the present application.

BACKGROUND

1. Field

Embodiments of the invention relate to floor installation. More specifically, embodiments of the invention relate to installation of modular floor tiles in aircraft.

2. Related Art

In typical aircraft, the space under the cabin floor contains aircraft system lines as well as structural and mechanical components. This space contains components vital to the operation of the aircraft that require inspection, maintenance, and replacement. Gaining access to these vital components can be difficult and time consuming. Typically, an interior floor of the cabin is removed to provide access for maintenance personnel. Installation of current aircraft flooring can take days or even weeks and requires specialized personnel. Further, the interior floor may have a hard base that may be difficult and time consuming to remove when access to the cabin subfloor is required. Accordingly, a modular flooring system that is lightweight, durable, and easily installed and removed and that meets Federal Aviation Administration (FAA) requirements for aircraft interior floors is needed. Further, what is needed is a flooring system that reduces the burden on installation and removal such that labor and technical skill requirements are reduced.

SUMMARY

Embodiments of the invention solve the above-mentioned problems by providing systems and methods of a floor assembly that reduce labor time and technical skill required for installation.

A first embodiment of the invention is directed to a floor assembly for use in an aircraft having a subfloor, the subfloor being configured to access one or more access panels, compartments, or items underneath the subfloor, the floor assembly comprising an underlayment layer comprising an underlayment magnetic layer including a first magnetically-responsive material and an adhesive on at least one side of the underlayment magnetic layer for attaching the underlayment magnetic layer to the subfloor of the aircraft, an underlayment sublayer including a second magnetically-responsive material, wherein the underlayment sublayer is configured to attach to the underlayment magnetic layer via magnetic attraction, and a decorative layer, wherein the decorative layer is configured to attach to the underlayment layer, wherein a combined weight of the underlayment layer and the decorative layer is less than or equal to three pounds per square foot, wherein the decorative layer and the underlayment sublayer are configured to be selectively removable to access the access panels, compartments, or items underneath the subfloor.

A second embodiment of the invention is directed to a floor assembly for use in an aircraft having a subfloor, the subfloor being configured to access one or more access panels, compartments, or items underneath the subfloor, the floor assembly comprising an underlayment layer comprising an underlayment sublayer comprising a plurality of underlayment panels for attaching to the subfloor, an adhesive layer for attaching the underlayment sublayer to the subfloor, and a decorative layer comprising a plurality of decorative panels, wherein the decorative layer is configured to attach to the underlayment layer via magnetic attraction, wherein the decorative layer is configured to be selectively removable to access the access panels, compartments, or items underneath the subfloor.

A third embodiment of the invention is directed to a method of installing a floor assembly to a subfloor in an aircraft, the subfloor being configured to access one or more access panels, compartments, or items underneath the subfloor, the method comprising the steps of securing a decorative layer to an underlayment layer by magnetic attraction, wherein the underlayment sublayer comprises a first magnetically-responsive material, wherein the decorative layer comprises a second magnetically-responsive material for securing the decorative layer to the underlayment layer via magnetic attraction, securing an attachment layer of the underlayment layer to the subfloor, and securing an underlayment sublayer of the underlayment layer to the attachment layer, wherein a combined weight of the underlayment layer and the decorative layer is less than or equal to three pounds.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

BRIEF DESCRIPTION OF THE DRAWING FIGURES

Embodiments of this disclosure are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

Embodiments of the invention solve the above-described problems and provide a distinct advance in the art by providing systems and methods for installation and removal of a durable, lightweight, removable, modular floor assembly designed for aircraft. The floor assembly may be easily installed and removed, reducing labor time to hours rather than the days or weeks associated with current installation of current aircraft flooring. The technical skill required for the installation of the floor assembly may also be reduced.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Broadly, embodiments of the invention provide for a durable, lightweight, and removable floor for installation in, for example, an aircraft. The floor assembly may be modular comprising panels that may be attached to one another to make up the floor assembly. The floor assembly panels may further comprise a plurality of layers and sublayers providing various functions per layer. The floor assembly may attach to an existing floor or floor structure such as beams, rods, or intermittent platforms and the use of layering may provide stability and specific functionality to the floor assembly.

Further, the floor assembly may provide comfort and safety. Layers of the floor assembly may provide sound, thermal, and moisture insulation and may comprise fire retardant and slip resistant materials as well as any other safety feature necessary for the intended function of the floor assembly. Though, in exemplary embodiments described herein, the floor assembly is installed on an aircraft subfloor, the floor assembly and methods of floor assembly installation may be generalized to any home or building floors and walls.

Figure 1A:
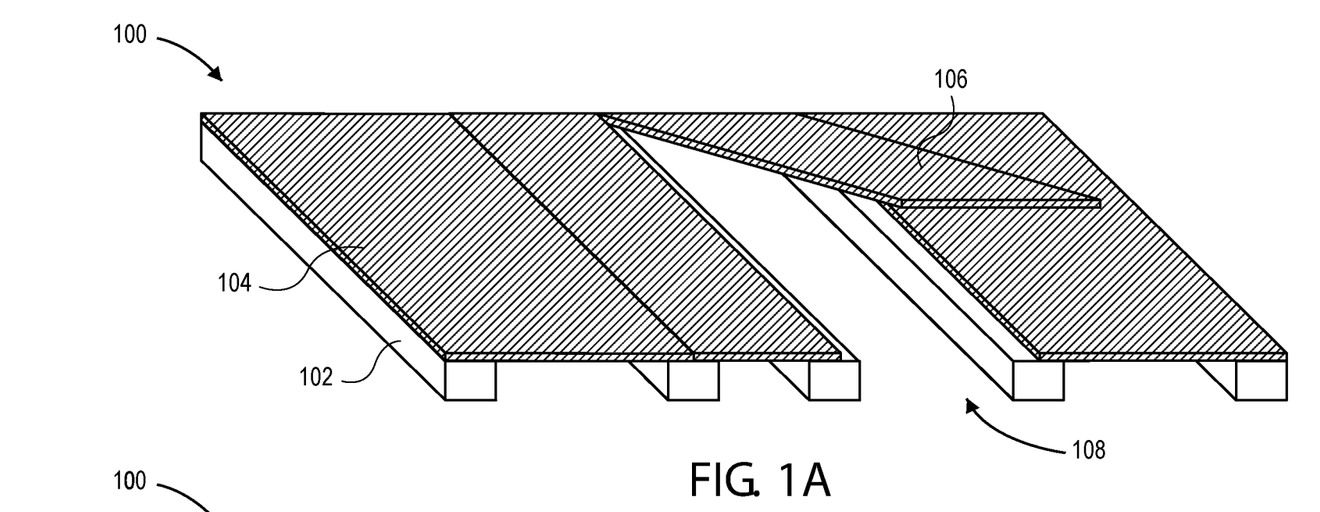
FIGS. 1A-B depict an embodiment of the floor assembly installed on a subfloor.
Figure 1B:
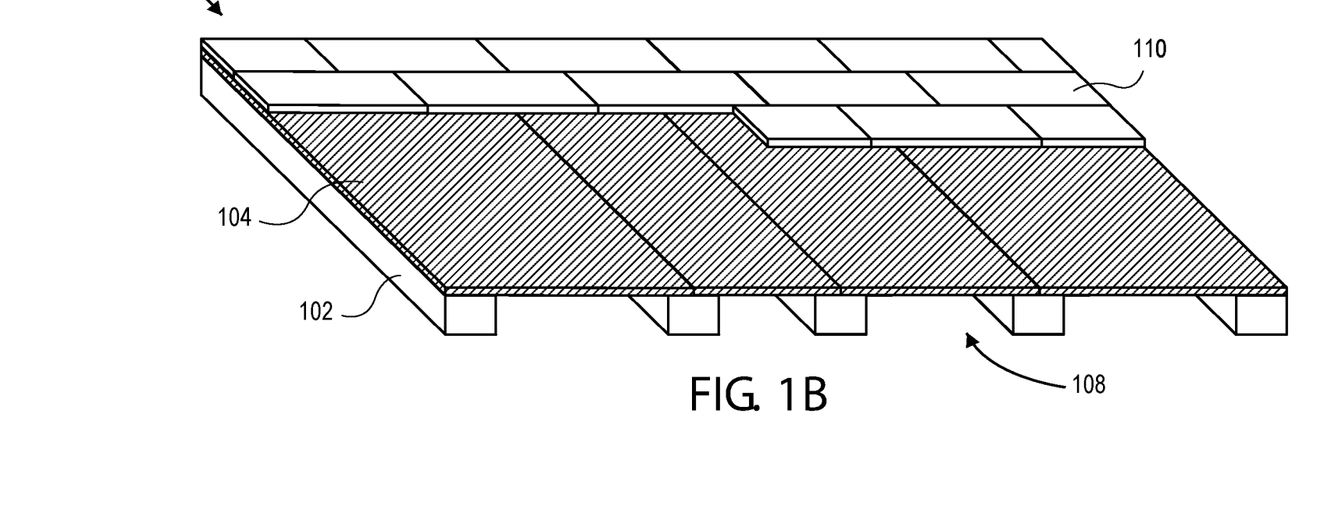

Turning first to FIGS. 1A-B depicting an exemplary embodiment of a floor assembly 100 partially installed on an aircraft subfloor 102. FIG. 1A depicts an underlayment layer 104 attached to the subfloor 102 allowing an underlayment panel 106 to be easily removed to allow access to a lower location 108 under the subfloor 102. The lower location 108 may be, in some embodiments, access panels, storage, electrical controls of any aircraft avionics or environmental systems, or attachments for seating in the cabin. In some embodiments, the underlayment panel 106 may be easily and quickly removed to provide access to the lower location for routine structural maintenance checks, or for any reason.

FIG. 1B depicts the floor assembly 100 of FIG. 1A with a decorative layer 110 secured to the underlayment layer 104. In some embodiments, the decorative layer 110 may be any carpet, tile, hard wood, laminate, or any other type of layer. In embodiments described herein, the decorative layer 110 is tile and plank, but this is exemplary only. As described below, the underlayment layer 104 and the decorative layer 110 are comprised of sublayers for providing structure, attachment methods, installation methods, and to conform to Federal Aviation Administration regulations. In some embodiments, the underlayment layer 104 and the decorative layer 110 are comprised of panels that may attach or otherwise interlock to form the layers of the floor assembly 100. In some embodiments, the floor assembly 100 may be installed in any home, building, or industrial location and any additional fire retardant or slip resistant materials may be added or subtracted to embodiments discussed herein to meet the regulations for any applications.

Figure 2A:
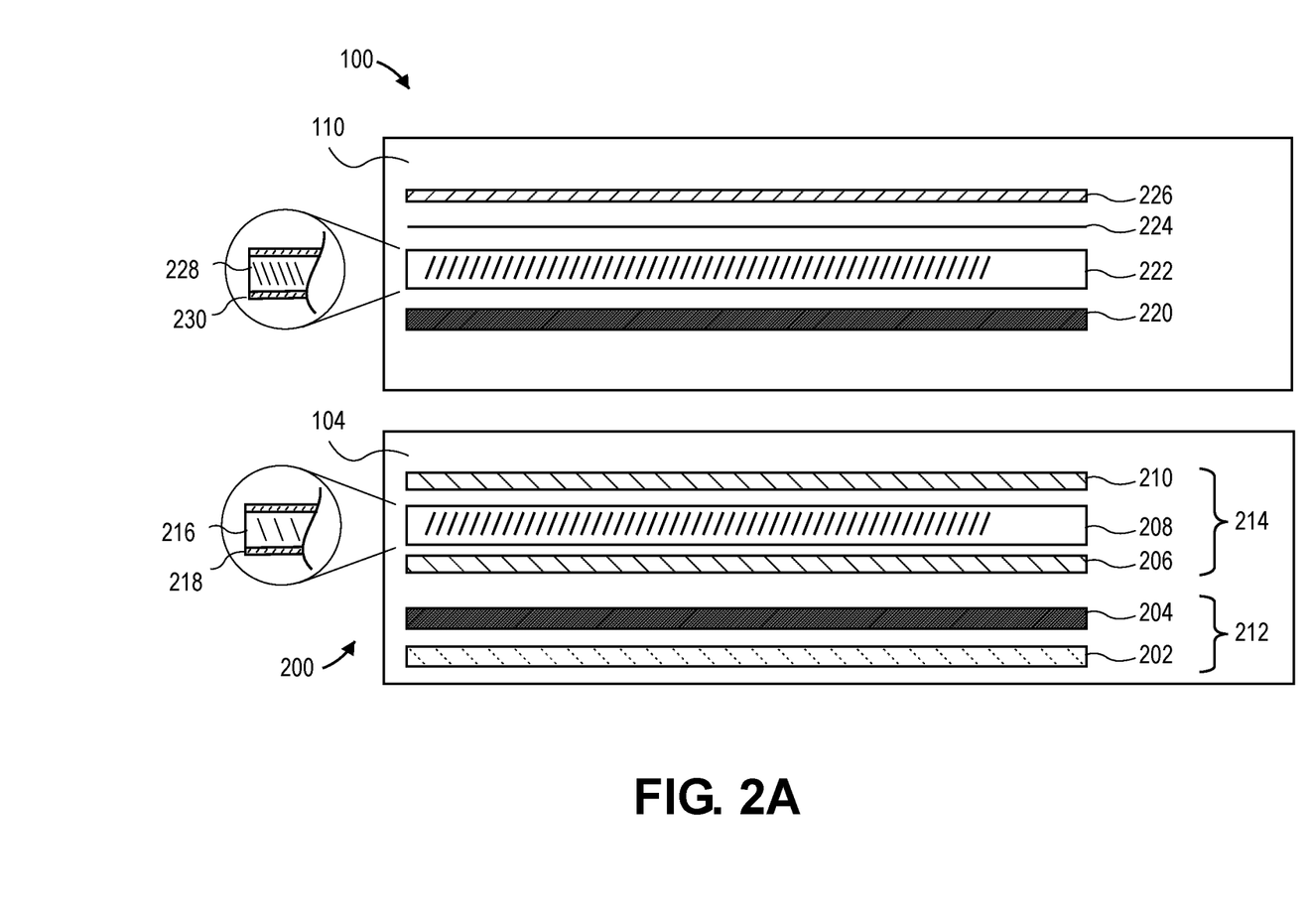
FIGS. 2A-B depict embodiments of the floor assembly layers.

Turning to FIG. 2A, the exemplary floor assembly 100 for some embodiments of the invention is depicted. The layers presented in FIG. 2A may represent individual layers of a panel of the floor assembly 100 such as, for example, the underlayment panel 106. In some embodiments, the floor assembly 100 comprises the underlayment layer 104 and the decorative layer 110 that, in some embodiments comprises tile and plank. The underlayment layer 104 is magnetically attached to the existing floor 202 allowing for quick and easy installation and removal. Once the underlayment layer 104 is installed, the decorative layer 110 may be secured to the top of the underlayment layer 104. The decorative layer 110 may be magnetically attached to the underlayment layer 104 providing for quick and easy installation and removal. Certain embodiments of the invention will be discussed building up from the existing floor 202.

In the embodiment depicted in FIG. 2A, the floor assembly 100 may be installed in an aircraft. A first layer 200 of the floor assembly 100 may be the underlayment layer 104, which includes the existing floor 202, an underlayment magnetic layer 204, a first receptor 206, a closed cell board 208, and a second receptor 210. The underlayment layer 104 may comprise two sublayers, namely a first underlayment sublayer 212 and a second underlayment sublayer 214.

A first underlayment sublayer 212 comprises the existing floor 202 and the underlayment magnetic layer 204. The existing floor 202 may be an aircraft subfloor and be comprised of aluminum or composite and may be attached to the aircraft frame or a floor frame including crossbeams. The existing floor 202 may comprise access panels and openings for easy access to an area below the existing floor 202, as described above. The existing floor 202 may be uneven and may have nuts and bolts or any other attachment mechanism for securing seats, tables, cabinets, or any other structure that may be fastened to the existing floor 202. The existing floor 202 may also comprise thin aluminum connected to crossbeams causing the existing floor 202 to be stable at the connection location and causing the existing floor 202 to depress at locations between the crossbeams. For example, a subfloor of an aircraft may have beams and a thin aluminum sheet between the beams. The thin aluminum sheet may not provide a structurally stable floor.

In some embodiments, the thin aluminum sheet may be corrugated to provide structure to the existing floor 202. The corrugated structure may reduce depression as described above, but the corrugated structure provides an uneven base. The floor assembly 100 may be attached to the beams and provide a continuous, level, and solid structure for the occupants of the cabin.

The second layer of the first underlayment sublayer 212 of the embodiment depicted in FIG. 2A is the underlayment magnet layer 204. The underlayment magnetic layer 204 may attach to the existing floor 202 and provide an attachment method for connecting the other layers of the floor assembly 100 to the existing floor 202. The underlayment magnetic layer 204 may be attached to the existing floor 202 by an adhesive such as glue, or by hook and loop fastener. The underlayment magnetic layer 204 may also be, or comprise, a peel and stick magnet such as magnetic tape. In some embodiments, the underlayment magnetic layer 204 may be comprised of a magnetically-responsive material such as a magnetic material, a ferromagnetic material, or any other material that may be responsive to a magnetic charge. The underlayment magnetic layer 204 may be cut to fit the existing floor 202. For example, the underlayment magnetic layer 204 may be cut to fit around seat attachments, access panels, handles, levers, and access openings. The underlayment magnetic layer 204 may be cut before or after the underlayment magnetic layer 204 is installed on the existing floor 202. Because the underlayment magnetic layer 204 is cut to the configuration of the existing floor 202, any openings or access panels may be exposed by removing layers of the floor assembly 100. Further, any seat, cabinet, or any other interior component fasteners may be exposed.

In some embodiments, for example, in aircraft, the size and weight of the floor assembly 100 influences functionality. In some embodiments, the underlayment magnetic layer 204 may be in the range of approximately one to seven millimeters thick and, in some embodiments, is approximately two to six millimeters or is approximately five millimeters thick. The size and the thickness of the underlayment magnetic layer 204 may be optimized according to the function and the size and thickness of the subsequent layers of the floor assembly 100. Further, the underlayment magnetic layer 204 may be sized to conform to aircraft regulations for the type and make of aircraft in which the underlayment magnetic layer 204 is to be installed. Further still, the underlayment magnetic layer 204 may be sized to conform to any FAA restrictions on magnetic materials in proximity to aircraft avionic components as will be discussed in greater detail below.

Once the underlayment magnetic layer 204 is installed on the existing floor 202, the second underlayment sublayer 214 may be attached. The second underlayment sublayer 214 may comprise the first receptor 206 for attaching to the underlayment magnetic layer 204, a closed cell board 208 providing structure and stability to the underlayment layer 104, and the second receptor 210 for attaching to a second floor assembly layer or, in embodiments described herein, the decorative layer 110.

The first receptor 206 may be a magnetically-responsive material such as a magnet of the opposite polarity of the underlayment magnetic layer 204, any ferromagnetic material, or any material that may be magnetically responsive to the underlayment magnetic layer 204. The first receptor 206 may provide a method for attaching the second underlayment sublayer 214 to the existing floor 202 by way of the first receptor 206 and the underlayment magnetic layer 204. The first receptor 206 may be attached to the closed cell board 208 of the underlayment layer 104 by an adhesive on a side opposite the underlayment magnetic layer 204. The first receptor 206 may be a peel and stick magnet such that the first receptor 206 may be stuck to the closed cell board 208 of the underlayment layer 104. The first receptor 206 may be secured to the underlayment magnetic layer 204 by magnetic force.

The first receptor 206, in some embodiments, may be in a range of one to five millimeters thick, may be in the range of two to four millimeters thick, and, in some embodiments, is approximately three millimeters thick. The thickness of the first receptor 206 may be optimized for strength and weight and may be chosen to match the size and thickness of the underlayment magnetic layer 204. Alternatively, the first receptor 206 may be optimized for performance and the underlayment magnetic layer may be sized based on the first receptor 206.

Continuing with the embodiment depicted in FIG. 2A, the first receptor 206 may be directly below and attached to a bottom side of the closed cell board 208. The closed cell board 208 may comprise a closed cell foam 216 and fiberglass skin 218. The closed cell foam 216 may be a lightweight polyurethane blown foam comprising bubbles that provides insulation and structure. The closed cell foam 216 may provide resistance to heat, noise, and moisture transfer. The closed cell foam 216 may provide an extra level of insulation to the floor assembly 100 and to the cabin of the aircraft. Further, the closed cell foam 216 may be compressible and may conform to the unevenness of the existing floor 202 creating a level base for the subsequent layers of the floor assembly 100.

In some embodiments, the closed cell foam 216 of the closed cell board 208 may be reinforced with a fiberglass skin 218. The fiberglass skin 218 may give the closed cell board 208 an extra structural component that may contribute to a higher level of rigidity for leveling the floor assembly 100 and supporting the aircraft cabin occupants. The fiberglass skin 218 may be attached to each side of the closed cell foam 216 including ends and edges or may be attached to the top or the bottom, or both the top and the bottom. The fiberglass skin 218 may be a pre-impregnated fiberglass that may surround the closed cell foam 216 on each side. The first receptor 206 may be attached to the fiberglass skin 218 on a bottom side of the closed cell board 208 such that the closed cell board 208 may attach to the existing floor 202 by way of the first receptor 206 in contact with the underlayment magnetic layer 204. In some embodiments, the fiberglass skin 218 is carbon fiber, metal, wood, fabric, or any other material that may be useful or otherwise functional for the purpose for which the closed cell board 208 is used.

Similarly, the second receptor 210 may be attached to a top side of the closed cell board 208 and may be any magnetically-responsive material as described above. The second receptor 210 may comprise the same or similar materials and structure as the first receptor 206. The second receptor 210 may also comprise a similar thickness and magnetic strength as the first receptor 206 and may provide a method for attaching the decorative layer 110 to the underlayment layer 104.

In some embodiments, the second receptor 210 is a ferromagnetic material and is secured to the closed cell board with adhesive. Alternatively, in some embodiments, the second receptor 210 may be a peel and stick magnet that attaches to the closed cell board 208 on the adhesive side and connects the decorative layer 110 on the magnetic side. In some embodiments, the first receptor 206 and the second receptor 210 may each be in a range of one to three millimeters and, in some embodiments, is approximately three millimeters thick.

The second layer of the floor assembly 100 is the decorative layer 110 which, in some embodiments, is a tile and plank assembly. In the embodiment depicted in FIG. 2A, the decorative layer 110 comprises four sublayers. A buildup from the bottom sublayer (tile magnetic layer) to the top sublayer (decorative sublayer) includes a tile magnetic layer 220, a core board 222, an adhesive 224, and a decorative sublayer 226. The decorative layer 110 may provide further insulation, stability, structure, and may provide a decorative feature because the top layer of the floor assembly 100 is exposed to the passengers.

The bottom sublayer of the decorative layer 110 may be the tile magnetic layer 220 for connecting to the second receptor 210 of the underlayment layer 104. In some embodiments, the magnetic layer 220 of the decorative layer 110 may be any magnetically-responsive material as described in embodiments above. The tile magnetic layer 220 may be a peel and stick magnet similar to the underlayment magnetic layer 204. The tile magnetic layer 220 may provide a magnetic material for attracting the second receptor 210. The tile magnetic layer 220 may be attached on a top side to the bottom side of the core board 222 with adhesive, hook and loop fasteners, bolts, screws, or any other fastener. The tile magnetic layer 220 may be in the range of approximately three to seven millimeters thick, or approximately five millimeters thick, in some embodiments, and provides a method for selectively attaching the decorative layer 110 to the underlayment layer 104.

The core board 222 may comprise an interior panel 228 comprising balsa wood that receives fiberglass 230 on each side similar to the closed cell board 208 of the underlayment layer 104. In embodiments, the core board 222 may be approximately 0.2-0.4 inches thick and in some embodiments is approximately 0.29 inches thick. The fiberglass 230 may be attached to each side of the interior panel 228 including ends and edges or may be attached to the top or the bottom, or both the top and the bottom. The core board 222 may provide extra stability, structure, and impact resistance as well as thermal, sound, and moisture insulation.

The core board 222 may be attached on a top side to a bottom side of the decorative sublayer 226. The attachment method may be an adhesive layer comprising glue, tape, or any type of peal-and-stick adhesive. In some embodiments, the adhesive layer may be hood and loop fasteners. In the embodiments described herein, the adhesive layer 224 is a double-sided tape that is manufactured to withstand temperatures as low as −65 degrees Fahrenheit and as high as +185 degrees Fahrenheit. The double-sided tape may be any adhesive that is manufactured for the intended purpose of the floor assembly 100 such that the adhesive layer 224 is operable under the environmental conditions to which it is exposed.

In some embodiments, the adhesive layer 224 attaches a top side of the core board 222 to a bottom side of the decorative sublayer 226. The decorative sublayer 226 comprises decorative features to be exposed to the occupants of the aircraft cabin. The decorative sublayer 226 may provide any soft or hard textural design such as, carpet, tiles, laminate, or any other floor feature. The decorative sublayer 226 may also be covered in a slip resistant laminate such that it meets safety requirements as applied by the regulatory commission that represents the industry for which the floor assembly is intended. For example, the Federal Aviation Administration (FAA) requires that the floors of an aircraft maintain a minimum coefficient of friction of 0.45 in both wet and dry conditions. A slip-resistant laminate may be added to the decorative sublayer 226 outer surface such that the floor assembly 100 meets the FAA requirement.

In some embodiments, the total thickness of the floor assembly 100 may be approximately 0.54 inches thick, or in the range of 0.4 inches thick to 0.6 inches thick with the underlayment layer 104 being approximately 0.15 inches, or in the range of 0.05 inches and 0.25 inches, and the decorative layer 110 being approximately 0.36 inches thick or in the range of 0.45 inches thick and 0.85 inches thick. The total weight of the floor assembly 100 may be approximately 2.6 pounds per square foot with the underlayment layer 104 being approximately 1.17 pounds per square foot or in the range of 0.75 pounds and 1.5 pounds and the decorative layer 110 being approximately 1.44 pounds per square foot or in the range of 1 pound to 2 pounds. In some embodiments, a combined weight of the underlayment layer 104 and the decorative layer 110 may be equal to or less than 2.8 pounds or, in some embodiments, three pounds per square foot. These lengths and weights are approximate values for the embodiments described above and, in some embodiments, the components and layers described herein may be any length and weight.

Figure 2B:
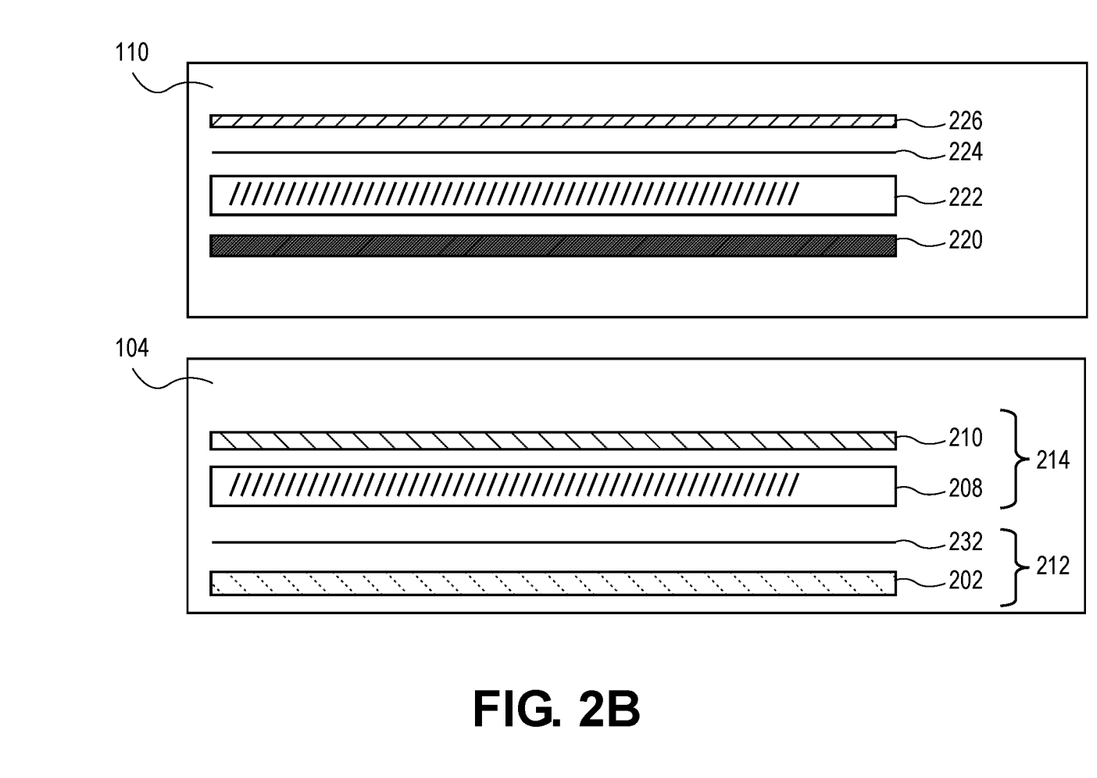

An alternative embodiment of the invention, as presented in FIG. 2B, includes an alternative attachment method to the existing floor 202 than in embodiments described above. Rather than attaching the closed cell board 208 to the existing floor 202 using magnetism, the closed cell board 208 may be attached with an attachment layer 232 comprising an adhesive, tape, or hook and loop fasteners. The alternative method of installation may be used when the peel and stick magnets or the underlayment magnetic layer 204 may not be attached to the existing floor 202. This method may provide the same or similar benefits as the underlayment magnetic layer 204 such that the existing floor 202 and compartments beneath may be easily accessible.

Because the underlayment magnetic layer 204 is not present in this embodiment, the closed cell board 208 also does not include the first receptor 206. The bottom side of the closed cell board 208 may be configured to be attached to the existing floor by any method that is selected for the function of the floor assembly 100. In some embodiments the closed cell board 208 is secured to the existing floor 202 by an adhesive as described above.

In the alternative embodiment presented in FIG. 2B, the total thickness of the floor assembly may be approximately 0.5 inches thick, or in the range of 0.48 and 0.52 inches thick with the underlayment being approximately 0.14 inches and the decorative layer 110 being approximately 0.36 inches. The total weight of the floor assembly 100 may be approximately 1.98 pounds per square foot, or in the range of 1.5 to 2.5 pounds per square foot with the underlayment layer 104 being approximately 0.54 pounds per square foot and the decorative layer 110 being approximately 1.44 pounds per square foot. In some embodiments the maximum weight of the floor assembly 100 may be approximately 2.0 pounds per square foot. The lengths and weights provided herein are approximate values for the alternative embodiment depicted in FIG. 2B and, in some embodiments, the components and layers described herein may be any length and weight.

Figure 3:
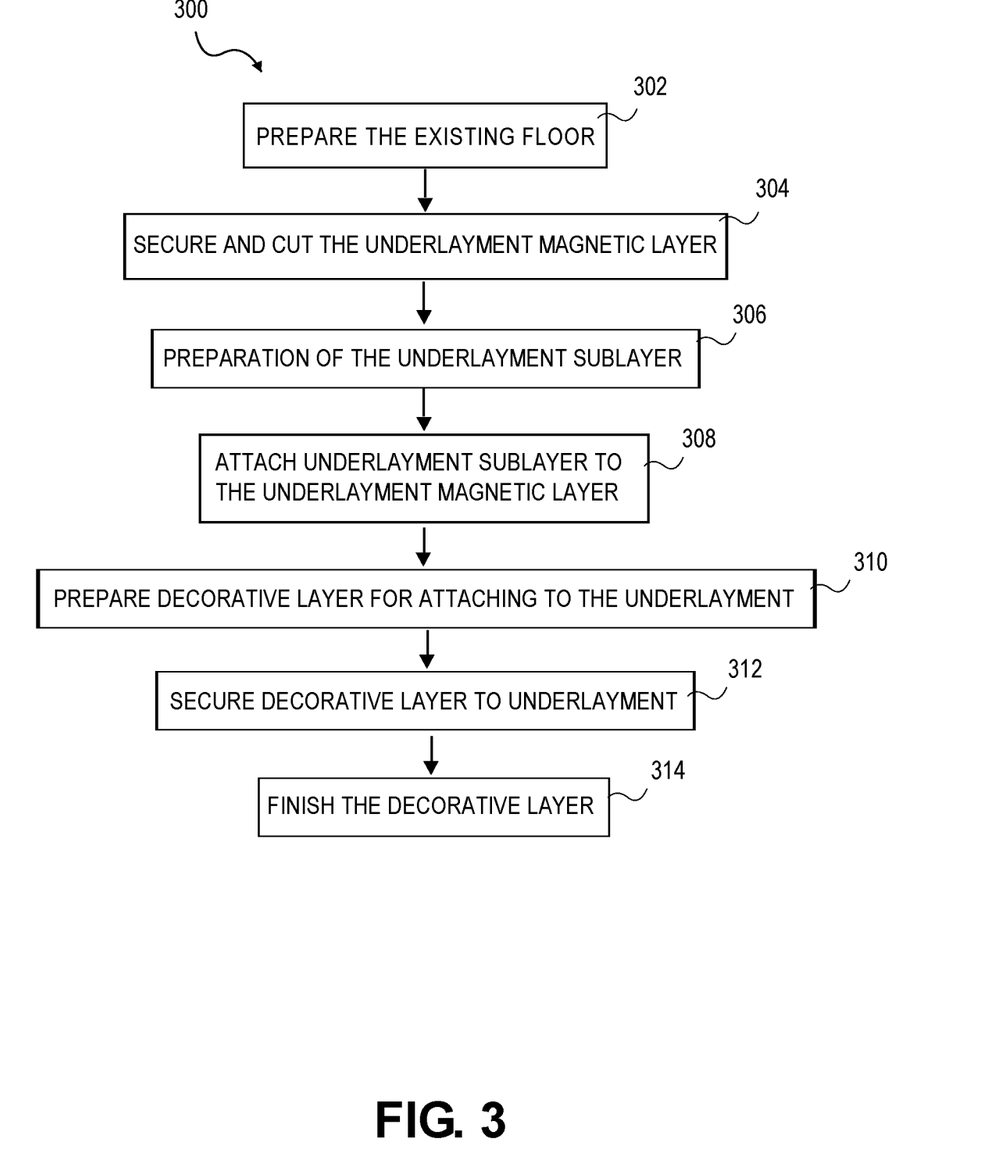
FIG. 3 depicts a flow diagram representing an exemplary method for installation of embodiments of the floor assembly.

FIG. 3 depicts a flow diagram for representing exemplary methods of installation of the floor assembly 100 in embodiments of the invention. In a Step 302, the existing floor 202 is prepared to receive the underlayment magnetic layer 204 as described in embodiments above. Screws, clamps, hinges, brackets, and any other objects that may be attached to the existing floor 202 may be removed. The existing floor 202 may be cleaned of dust and objects for laying the underlayment magnetic layer 204 directly on the surface of the existing floor 202. In some embodiments, the existing floor 104 is an aircraft cabin subfloor.

At a Step 304, the underlayment magnetic layer 204 is secured to the existing floor 202 and cut to allow access to the compartment below the existing floor 202 as described in embodiments above. In some embodiments, the underlayment magnetic layer 204 is a peel and stick magnet such that an adhesive is exposed when a peelable layer is removed from the underlayment magnetic layer 204. The exposed adhesive may be secured to the existing floor 202 attaching the underlayment magnetic layer 204 to the existing floor 202. Alternatively, the underlayment magnetic layer 204 may be secured to the existing floor 104 by the magnetic force provided by the underlayment magnetic layer 204. When the underlayment magnetic layer 204 is laid on the existing floor 202 any subfloor features that should be exposed such as screw holes, handles, fasteners, access panels, should be marked. In this way when the underlayment magnetic layer 204 is secured, the underlayment magnetic layer 204 may be cut to expose these existing floor 202 features.

Once the underlayment magnetic layer 204 is secured in place the underlayment magnetic layer 204 may be cut around access panels, screw holes, and any attachments, handles, or any other features that should be exposed and accessible when the decorative layer 110 and the second underlayment sublayer 214 are removed. Once the underlayment magnetic layer 204 is cut to expose features of the existing floor 202, any fasteners and attachments can be put back in place in the existing floor 202.

At a Step 306, the second underlayment sublayer 214 is prepared to be installed on the underlayment magnetic layer 204. The second underlayment sublayer 214 should be cut to fit any contours of the existing floor 202 such that the second underlayment sublayer 214 fits the dimensions of the existing floor 202 and is removable to expose the features of the existing floor 202 such as, for example, the access panels discussed above. All contours and features of the existing floor 202 may be drawn on the second underlayment sublayer 214 and the second underlayment sublayer 214 may be cut to fit the contours and features of the existing floor 202. The underlayment sublayer 214 may be cut using a saw, knife, or any other cutting device as described above.

At a Step 308, the second underlayment sublayer 214 is attached to the magnetic underlayment layer 204 as described in embodiments above. The second underlayment sublayer 214 panels as cut are laid on the underlayment magnetic layer 204 and held in place by the magnetic force provided by the underlayment magnetic layer 204. Once the underlayment magnetic layer 204 is in place and secure, the decorative layer 110 may be added.

At a Step 310, the decorative layer 110 and the underlayment layer 104 are prepared for securing the decorative layer 110 to the underlayment layer 104. The existing floor 202 is typically not flat on an aircraft. Though the existing floor 202 may not be level, there are several methods that may be implemented to achieve a level floor assembly 100 supported by the existing floor 202. In some embodiments, kerfing may be used to level the decorative layer 110. In an exemplary embodiment, the decorative layer 110 comprises tile and plank. An under side of the tile and plank facing the underlayment magnetic layer 204 may be cut such that the tile and plank bends. Kerfing in concave and convex areas will accommodate tile edge height variances. This allows the tile and plank to conform to the existing floor 202 when the existing floor 202 bows and is not level.

Further, in some embodiments extra layers of the underlayment magnetic layer 204 may be added in some sections to level the first underlayment sublayer 212. Some sections of the existing floor 202 may be higher than other areas. This causes the floor assembly 100 to be higher in those areas and lower in the low areas when no leveling methods are performed. Extra layers of the underlayment magnetic layer 204 may be added to the low areas to bring the low areas to the same height as the high areas. This provides a level underlayment layer 104 supporting the decorative layer 110. The combination of kerfing and layering of the underlayment magnetic layer 204 provides the floor assembly 100 the adaptability to level the floor assembly 100 secured to an uneven and nonlevel existing floor 202.

At a Step 312, the decorative layer 110 is secured to the underlayment layer 104. Continuing with the exemplary embodiment described above in which the decorative layer 110 is a tile and plank layer, the tiles, or panels, are laid out in succession staggering the tiles such that the edges of each succeeding row align in a brick-wall-like pattern as depicted in FIG. 1. In some embodiments, the lower most layer of the tile and plank layer is the tile magnetic layer 220. The tile magnetic layer 220 may be secured to the underlayment layer 104 using magnetic force as described in embodiments above. The upper-most layer of the underlayment layer 104 may be the second receptor 210 or comprise any magnetic layer or ferromagnetic material.

At a Step 314, the decorative layer 110 is finished for appearance and to meet the regulations of the governing body for the intended use of the floor assembly 100. For example, the FAA may require that all four sides of the floor assembly 100 decorative layer 110 be framed at the edges. Further, the FAA may require that the coefficient of friction of the floor assembly 100 be at a minimum dynamic coefficient of friction of 0.45 as defined by a standard FAA friction test. In some embodiments, the dynamic coefficient of friction is equal to or greater than 0.2. The floor assembly 100 may be finished with framed edges and a slip resistant material to meet the FAA regulations. Further, a fire retardant finish may be applied to the surface of the decorative sublayer 226.

In some embodiments, the floor assembly 100 is waterproof and in some embodiments the floor assembly 100 is water resistant. The decorative layer 110 may be removed simply and easily for access to the underlayment layer 104 and the existing floor 202. If liquid or any substance is spilled on the floor assembly 100, the panels of the floor assembly 100 may simply be removed and cleaned if the substance penetrates the panels or the seams between the panels. This provides quick and easy cleaning and maintenance that prolongs the life of the floor assembly 100 therefore reducing replacement costs. Further, in the event that damage occurs to a panel of the floor assembly 100, the panel or panels may simply be removed and replaced.

In some embodiments, the floor assembly 100 meets FAA regulations for various sizes of aircraft. The floor assembly 100 may meet Federal Aviation Regulations (FAR) Part 23 for normal aircraft and FAR Part 25 for transport aircraft. Specifically, the floor assembly 100 may meet the requirements for FAR Part 25.853(a) for 12 and 60 second vertical burn tests. Further, the floor assembly 100 may meet the requirements for the FAR Part 25.793 resistance to slip test as described above.

The magnetic layers, such as the underlayment magnetic layer 204 and the tile magnetic layer 220 described in embodiments above, may conform to category Z designation per DO-160G Environmental Conditions and Test Procedures for Airborne Equipment as published by the Radio Technical Commission for Aeronautics (RTCA). This designation ensures that the magnet material used in the floor assembly 100 can be safely installed at a minimum of twelve inches or further from a flux gate, a gyroscopic instrument, and a magnetic compass.

Embodiments of the floor assembly 100 described herein may be compliant with all applicable Federal Aviation Administration (FAA) requirements regarding aircraft interior flooring including but not limited to fire behavior, slip resistance, magnetic effect, falling objects of mass, shear load/tensile load strength, short-term indention (high heel) on cuffed tile, resistance to strain, low temperature exposure, short-time operating high temperature exposure, severe humidity environment, and light resilience. The floor assembly 100 may meet or exceed the requirements for all normal category airplanes and transport category airplane as set forth by the FAA, specifically, CFR 14, FAR Parts 23 and 25.

The size, thickness, material, coatings, and attachment methods of the layers of the floor assembly 100 may be chosen based on the intended function of the floor assembly 100. For example, the magnetic layers may be required to be stronger for some applications. In an aircraft, the flooring may have stronger attachments for dealing with turbulence or to meet crash regulations while in an office building the floor assembly 100 may use weaker attachment methods. Similarly, in an aircraft the core board 222 and the closed cell board 208 may require greater thickness and stability to level the floor assembly 100 on an existing uneven floor such as the existing floor 202 and prevent falling objects from puncturing the floor assembly 100. In a home or office environment, the existing floor 202 may provide structural support and durability and the extra structure and layers may not be necessary. Further, the floor assembly 100 may be used in a manufacturing plant that has different requirements for slippage, fire, and durability as required by, for example, the Occupational Safety and Health Administration (OSHA). The floor assembly 100 may be modified by any treatment or material additions to meet the requirements set forth by OSHA or any other regulatory commission. Any combination of sizes, shapes, and safety requirements of any layer may be used depending on the operational environment of the floor assembly 100.

Though some embodiments of the invention have been described in use with aircraft, and specifically airplanes, the floor assembly 100 may be used with helicopters, boats, cars, construction equipment, or may be used in homes, offices, industrial plants, or any other location interior or exterior.

Although the invention has been described with reference to the embodiments illustrated in the attached drawing figures, it is noted that equivalents may be employed and substitutions made herein without departing from the scope of the invention.

The invention claimed is:

1. An aircraft floor assembly for use with an aircraft subfloor, the aircraft subfloor being configured to access one or more access panels, compartments, or items underneath the aircraft subfloor, the aircraft floor assembly comprising:
    an underlayment layer comprising:
        an underlayment magnetic layer including an adhesive on at least one side of the underlayment magnetic layer for attaching the underlayment magnetic layer to the aircraft subfloor; and
        an underlayment sublayer including a first magnetically responsive material and a second magnetically_responsive material,
        wherein the underlayment sublayer is configured to attach to the underlayment magnetic layer via magnetic attraction between the underlayment magnetic layer and the first magnetically responsive material of the underlayment sublayer; and
    a decorative layer comprising a magnetic layer,
    wherein the magnetic layer is adjacent the second magnetically responsive material of the underlayment layer and attaches the decorative layer to the underlayment layer,
    wherein a combined weight of the underlayment layer and the decorative layer is less than or equal to three pounds per square foot,
    wherein the decorative layer and the underlayment sublayer are configured to be selectively removable to access the one or more access panels, the compartments, or the items underneath the aircraft subfloor.

2. The aircraft floor assembly of claim 1, wherein the underlayment sublayer further comprises:
    a closed cell board,
        wherein the second magnetically_responsive material is attached to a bottom of the closed cell board and comprises a ferromagnetic material; and
    an underlayment receptor attached to a top side of the closed cell board,
        wherein the underlayment receptor comprises the first magnetically responsive material.

3. The aircraft floor assembly of claim 2, wherein the decorative layer comprises:
    a core board;
    a decorative layer magnetic layer attached to a bottom side of the core board for securing the decorative layer to the underlayment layer by magnetic force between the underlayment receptor and the decorative layer magnetic layer; and
    a decorative sublayer attached to a top side of the core board.

4. The aircraft floor assembly of claim 3, wherein the decorative sublayer is attached to the core board by an adhesive layer configured to be operable in a range of temperatures of −65 degrees Fahrenheit to +185 degrees Fahrenheit.

5. The aircraft floor assembly of claim 3, wherein the decorative sublayer comprises a coating having a dynamic coefficient of friction of at least 0.2 to provide for a slip resistant finish.

6. The aircraft floor assembly of claim 3, wherein a combined thickness of the underlayment layer and the decorative layer is between 0.4 and 0.6 inches.

7. An aircraft floor assembly for use with an aircraft subfloor, the aircraft subfloor being configured to access one or more access panels, compartments, or items underneath the aircraft subfloor, the aircraft floor assembly comprising:
    an underlayment layer comprising:
        an underlayment sublayer comprising a plurality of underlayment panels for attaching to the aircraft subfloor;
        an adhesive layer for attaching the underlayment sublayer to the aircraft subfloor; and
        a receptor layer comprising a magnetically responsive material disposed on a side opposite the adhesive layer;
    a decorative layer comprising a plurality of decorative panels, each decorative panel comprising a decorative magnetic layer,
    wherein the decorative layer is configured to attach to the underlayment layer via magnetic attraction between the decorative magnetic layer and the receptor layer,
    wherein the decorative layer is configured to be selectively removable to access the one or more access panels, the compartments, or the items underneath the aircraft subfloor.

8. The aircraft floor assembly of claim 7, wherein each underlayment panel comprises:
    a closed cell board,
        wherein the receptor layer is attached to a top side of the closed cell board for attaching the decorative layer.

9. The aircraft floor assembly of claim 8, wherein the receptor layer comprises a ferromagnetic material.

10. The aircraft floor assembly of claim 7, wherein each decorative panel of the plurality of decorative panels comprises:

a core board,
wherein the decorative magnetic layer is attached to a bottom side of the core board comprising a magnetic material; and
a decorative sublayer attached to a top side of the core board,
wherein the decorative magnetic layer secures each decorative panel to each underlayment panel of the plurality of underlayment panels via magnetic force.

11. The aircraft floor assembly of claim 10,
wherein the decorative magnetic layer secures each decorative panel to a receptor of the underlayment layer,
wherein the receptor of the underlayment layer comprises a ferromagnetic material.

12. The aircraft floor assembly of claim 7, wherein a combined thickness of the underlayment layer and the decorative layer is in a range of 0.4 inches to 0.6 inches and a combined weight of the underlayment layer and the decorative layer is less than or equal to 2.5 pounds per square foot.

13. A method of installing an aircraft floor assembly to an aircraft subfloor, the aircraft subfloor being configured to access one or more access panels, compartments, or items underneath the aircraft subfloor, the method comprising the steps of:
   securing a decorative layer to an underlayment layer by magnetic attraction,
   wherein the underlayment layer comprises a first magnetically_responsive material,
   wherein the decorative layer comprises a second magnetically_responsive material for securing the decorative layer to the underlayment layer via magnetic attraction;
   securing an attachment layer of the underlayment layer to the aircraft subfloor by an adhesive; and
   securing an underlayment sublayer of the underlayment layer to the attachment layer,
   wherein a combined weight of the underlayment layer and the decorative layer is less than or equal to three pounds.

14. The method of claim 13, wherein the attachment layer comprises a magnetic material that is secured to the aircraft subfloor with an adhesive.

15. The method of claim 14, wherein the underlayment layer comprises:
   a closed cell board;
   a first receptor comprising a first ferromagnetic material attached to a bottom side of the closed cell board for attaching to the aircraft subfloor; and
   a second receptor comprising a second ferromagnetic material attached to a top side of the closed cell board for attaching to the decorative layer.

16. The method of claim 15, wherein the decorative layer comprises:
   a core board;
   a decorative sublayer attached to a top side of the core board; and
   a magnetic layer attached to a bottom side of the core board for attaching the decorative layer to the second receptor of the underlayment layer via magnetic attraction.

17. The method of claim 13, wherein the attachment layer is an adhesive for securing the underlayment layer to the aircraft subfloor.

18. The method of claim 17, wherein the underlayment layer comprises:
   a closed cell board;
   a first receptor attached to a bottom side of the closed cell board; and
   a second receptor comprising a magnetically_responsive material attached to a top side of the closed cell board.

19. The method of claim 18, wherein the decorative layer comprises:
   a core board;
   a decorative magnetic layer attached to a bottom side of the core board,
   wherein the decorative layer is secured to the underlayment layer by magnetic attraction provided by the decorative magnetic layer magnetically interacting with the second receptor; and
   a decorative sublayer attached to a top side of the core board.

20. The method of claim 19, wherein the decorative magnetic layer comprises magnetic material and the second receptor comprises a ferromagnetic material.

* * * * *